June 30, 1942.   R. A. STEVENSON   2,288,330
PURIFICATION OF PETROLEUM CONTAMINATED WATERS
Filed Sept. 30, 1940
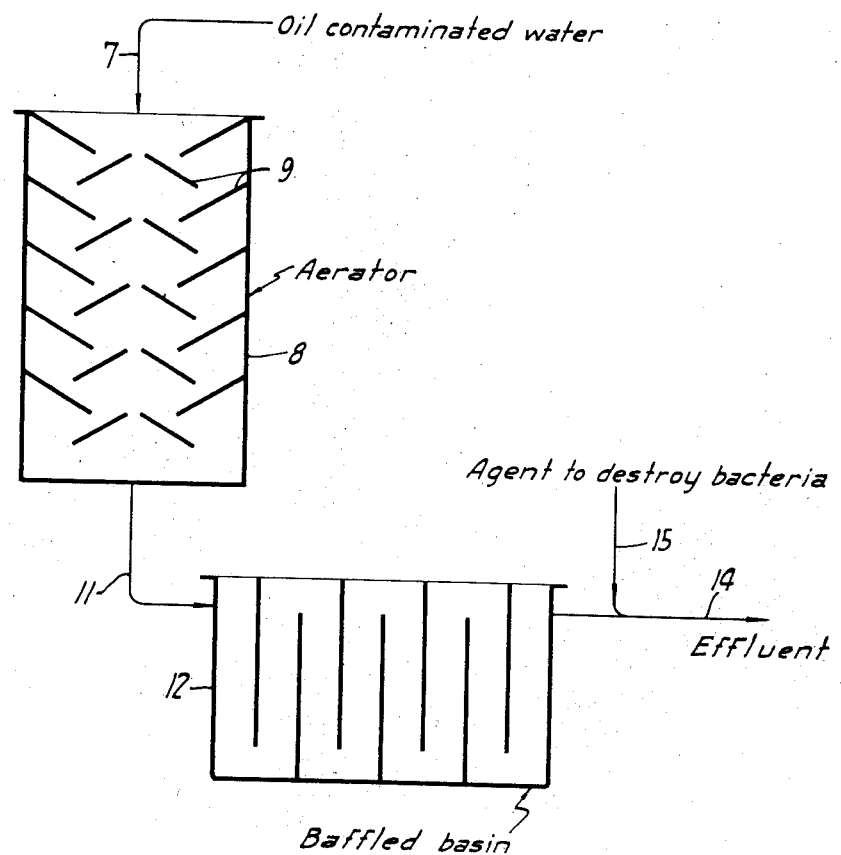
INVENTOR
Ralph A. Stevenson
BY
ATTORNEY Patented June 30, 1942

2,288,330

UNITED STATES PATENT OFFICE 2,288,330

PURIFICATION OF PETROLEUM CONTAMINATED WATERS

Ralph A. Stevenson, Los Angeles, Calif.

Application September 30, 1940, Serial No. 358,956

5 Claims. (Cl. 210—2)

This is a continuation in part of my application Serial Number 164,884 filed September 21, 1937, (now Patent No. 2,217,143 of October 8, 1940,) from which certain subject matter, unclaimed therein, has been taken to provide this application.

This invention relates to a process for purifying and rendering stable a water-contaminated with crude petroleum oil or waste petroleum oil from a refinery of crude petroleum, the oil containing sulfur on which bacteria can feed to form an objectionable product such as gelatinous sludge or hydrogen sulfide. While these waters contain only small quantities of oil their purification has heretofore presented a special and unusual problem, for which no simple, cheap solution was provided until the present invention.

Heretofore such water has been treated first by aeration and then by passage through a baffle basin wherein heavy oil was skimmed off and the water passed into a retention basin of several days capacity. This treatment was effective in reducing the oil content of the water to the order of one hundred parts per million by weight and less. The waste water containing this relatively small amount of oil, when held in a retention basin, resulted in the formation of a gelatinous flocculent precipitate which settled to the bottom, gathering and retaining oil as it fell. During retention, flocculent and gelatinous masses would rise from the bottom and float to the top to release oil in large masses, so that the effluent was at times contaminated by relatively large masses of oil, of the order of one thousand parts per million. When the effluent from the retention basin was released into bays, sloughs and into the ocean, a serious pollution problem was presented because release of the flocculent gelatinous masses was attended by hydrogen sulfide. This material is, of course, objectionable because of atmospheric pollution, corrosion and extreme harm to marine life.

The release of the water from the retention basin through a pipe line or other closed conduit was attended with other difficulties. The line, in a short time, became coated with a scale like coating. This coating, a hard, oil impregnated mass releasing hydrogen sulfide and oil on contact with the atmosphere, would frequently break off and pass on for eventual contaminating release in some free body of water.

As public attention became directed to the matter, search for a solution for the problem became intensified and it was proposed to increase the size of the retention basins so that the waste water could be held for a greater length of time. This proposal was not only ineffective, but in fact aggravated the objectionable condition. The gelatinous flocculent precipitate or mass which forms, I have now determined, results from the action of an organism, probably a schizomycetes, probably beggiatoa which can feed upon the sulfur in the oil. That such an organism was responsible for the troublesome precipitates and pipe line coating formation was most unexpected because these waters usually contained such a high content of oil, sodium chloride, magnesium chloride and other salts that one would consider bacterial action out of the question.

The form of bacteria present is not the ordinary sulfur-splitting bacteria, because this type of bacteria will feed upon and will increase by utilization of the sulfate content of the water. I have successfully used a process which does not alter appreciably the dissolved sulfate content, thus apparently proving the point that the sulfur upon which the bacteria feed is in the oil.

I have determined that if the oil is substantially completely removed from the water, then the gelatinous and flocculent precipitate does not form, and the water remains inoffensive.

In accordance with this invention I first subject the water to any economical process effective to reduce the oil content to some relatively small value, preferably less than a hundred parts per million. This can be achieved by aeration and settling, settling alone, by primary settling and subsequent flocculation of a coagulant, by coagulation alone, coagulation followed by filtration, filtration alone or merely by skimming or by any other suitable operation. In the accompanying drawing I have indicated diagrammatically a suitable process for practicing the invention. As appears in the drawing, oil contaminated water from a source is delivered through line 7 into suitable aeration means indicated by the aeration tank 8. This is so constructed that the water is aerated without further emulsifying free oil in the water. I have found that by permitting the water to discharge and flow gently over a series of baffles 9, the water can be thoroughly aerated without increasing the emulsified oil content. The aerated waste water is discharged through line 11 into a baffled basin indicated at 12, wherein free oil rises and is readily skimmed off. Effluent water is discharged from the basin through line 14.

While the water after its initial treatment may have such a low oil content that it can be permissibly discharged from line 14 into a larger body of water, a stream, slough, river or the ocean, hydrogen sulfide can subsequently be generated. Sufficient hydrogen sulfide can exist in the presence of free oxygen to an extent and for a period sufficient to be extremely harmful to marine life. In accordance with this invention, after reduction of the oil content to some small value, a hundred parts per million and preferably less, I treat the water to kill the bacteria and thus ensure that hydrogen sulfide is not subsequently generated. This can be achieved by sterilzation as at 15 with chlorine, bromine, iodine, chloramine, a hypochlorite, hypochlorous acid or any other suitable sterilizing agent or agents effective to destroy the bacteria such as zinc chloride, copper sulfate or chlorophenol. Chlorination with from five to twenty parts per million usually suffices. Rendering the bacteria ineffective by sterilizing the water, even with oil remaining, permits the water to be discharged safely without destruction to marine life.

The specific process steps are illustrative only and the initial reduction in oil content can be achieved by any suitable means. Although preliminary aeration is preferred because it provides a more economical operation, it is not absolutely essential. Omitting aeration may require more of a chemical agent to destroy the hydrogen sulfide or the bacteria.

If the process is properly operated, the water released is substantially free of sulfide. This obviates the difficulties previously encountered with the retention basin operation which released water having a high soluble sulfide content, which was reduced to hydrogen sulfide, a material highly corrosive to concrete and metals and objectionable from an atmosphere pollution standpoint. The presence of hydrogen sulfide in water is also highly undesirable because of its destruction of marine life, fish, mollusks and crustaceans.

The present process obviates another difficulty in that by removing the oil and destroying the bacteria formation of the gelatinous, flocculent precipitate is avoided. This is a further advantage because this precipitate acts as a binder for suspended matter and causes scale formation in the pipes and conduits utilized to handle the water.

I claim:

1. A process for purifying and rendering stable a water contaminated with crude petroleum oil or waste petroleum oil from refineries of crude petroleum, the oil containing sulfur on which bacteria can feed to form in the water an objectionable product, said process comprising aerating said water, separating said oil from the aerated water to reduce the oil content thereof, and chlorinating remaining water to render said bacteria ineffective to produce hydrogen sulfide and to render a free oxygen content maintainable in said water even in the presence of remaining petroleum oil.

2. A process for purifying and rendering stable a water contaminated with crude petroleum oil or waste petroleum oil from refineries of crude petroleum, the oil containing sulfur on which bacteria can feed to form an objectionable product, said process comprising aerating said water, separating said oil from the aerated water to reduce the oil content thereof, and treating remaining water with a sterilizing agent selected from the group consisting of chlorine, bromine, iodine, chloramine, a hypochlorite and hypochlorous acid to render said bacteria ineffective to produce hydrogen sulfide and to render a free oxygen content maintainable in said water even in the presence of remaining petroleum oil.

3. A process for purifying and rendering stable a water contaminated with crude petroleum oil or waste petroleum oil from refineries of crude petroleum, the oil containing sulfur on which bacteria can feed to form in the water an objectionable product, said process comprising separating said oil from the water to reduce the oil content thereof, and treating remaining water with a sterilizing agent selected from the group consisting of chlorine, bromine, iodine, chloramine, a hypochlorite and hypochlorous acid, to render said bacteria ineffective to produce hydrogen sulfide and to render a free oxygen content maintainable in said water even in the presence of remaining petroleum oil.

4. A process for purifying and rendering stable a water contaminated with crude petroleum oil or waste petroleum oil from refineries of crude petroleum, the oil containing sulfur on which bacteria can feed to form in the water an objectionable product, said process comprising separating said oil from the water to reduce the oil content thereof, and treating remaining water with a sterilizing agent to render said bacteria ineffective to produce hydrogen sulfide and to render a free oxygen content maintainable in said water even in the presence of remaining petroleum oil.

5. A process for purifying and rendering stable a water contaminated with crude petroleum oil or waste petroleum oil from refineries of crude petroleum, the oil containing sulfur on which bacteria can feed to form in the water an objectionable product, said process comprising separating said oil from the water to reduce the oil content thereof, and chlorinating remaining water to render said bacteria ineffective to produce hydrogen sulfide and to render a free oxygen content maintainable in said water even in the presence of remaining petroleum oil.

RALPH A. STEVENSON.